United States Patent [19]

Sivavec

[11] Patent Number: 5,595,586
[45] Date of Patent: Jan. 21, 1997

[54] METHOD FOR RECOVERY OF VOLATILE ORGANIC COMPOUNDS

[75] Inventor: Timothy M. Sivavec, Clifton Park, N.Y.

[73] Assignee: General Electric Company, Schenectady, N.Y.

[21] Appl. No.: 400,429

[22] Filed: Mar. 3, 1995

Related U.S. Application Data

[63] Continuation of Ser. No. 23,457, Feb. 26, 1993, abandoned.

[51] Int. Cl.$^6$ ................................................. B01D 53/04
[52] U.S. Cl. ........................ 95/143; 95/144; 95/146
[58] Field of Search .......................... 95/142, 147, 141, 95/143–146, 148; 210/692; 423/240, 245.1

[56] References Cited

U.S. PATENT DOCUMENTS

| | | | |
|---|---|---|---|
| 3,686,827 | 8/1972 | Haigh et al. | 95/143 X |
| 3,798,876 | 3/1974 | Kennedy | 95/143 X |
| 4,239,508 | 12/1980 | Rock et al. | 95/147 |
| 4,286,972 | 9/1981 | Savage et al. | 95/147 X |
| 4,344,775 | 8/1982 | Klein | 95/141 |
| 4,519,816 | 5/1985 | Clarke | 95/147 X |
| 4,556,705 | 12/1985 | McCready | 528/289 |
| 4,711,933 | 12/1987 | McCready et al. | 525/415 |
| 4,728,343 | 3/1988 | Snyder | 95/143 |
| 4,749,496 | 6/1988 | Reischl | 210/692 |
| 4,764,282 | 8/1988 | Snyder | 210/690 |
| 4,820,318 | 4/1989 | Chang et al. | 95/142 X |
| 4,842,621 | 6/1989 | Robbins et al. | 95/142 X |
| 4,857,084 | 8/1989 | Robbins et al. | 95/147 X |
| 4,956,095 | 9/1990 | Robeson et al. | 95/142 X |
| 5,122,166 | 6/1992 | Hyrcyk et al. | 95/141 |
| 5,199,962 | 4/1993 | Wijamns | 55/75 |
| 5,281,257 | 1/1994 | Harris | 95/142 X |
| 5,294,246 | 3/1994 | Gardner, Sr. | 95/146 X |
| 5,368,754 | 11/1994 | Von Klock et al. | 95/147 X |

FOREIGN PATENT DOCUMENTS

| | | | |
|---|---|---|---|
| 51-065080 | 6/1976 | Japan | 95/147 |
| WO93/25297 | 12/1993 | WIPO | 95/147 |

OTHER PUBLICATIONS

"Reduction of Volatile Organic Compounds in Aqueous Solutions Through Air Stripping and Gas–Phase Carbon Adsorption", CS Fang, SL Khor, Environmental Progress (vol. 8, No. 4), pp. 270–278, Nov., 1989.
"Vapor –Phase Adsorption", CS Parmele, WL O'Connell, HS Basdekis, Chemical Engineering, pp. 58–70, Dec. 31, 1979.
"Factors Affecting Hydrocarbon Removal by Air Stripping", WE McFarland, Groundwater Remediation, pp. 42–48.
C. S. Fang et al., "Reduction of Volatile Organic Compounds in Aqueous Solutions through Air Stripping & Gas–Phase Carbon Adsorption", *Environmental Progress*, (vol. 8, No. 4), Nov. 1989, pp. 270–278.
C. S. Parmele et al., "Vapor–Phase Adsorption", *Chemical Engineering*, Dec. 31, 1979, pp. 58–70.
W. E. McFarland, "Factors Affecting Hydrocarbon Removal by Air Stripping", Groundwater Remediation, Nov. 1992, pp. 42–48.

*Primary Examiner*—Robert Spitzer
*Attorney, Agent, or Firm*—James Magee, Jr.

[57] ABSTRACT

A method for separating volatile organic compounds (VOCs), such as trichloroethylene, from air by sorption followed by desorption of the VOCs. The VOCs from the contaminated ground water are air stripped and then sorbed on a sorbent, such as a polyester elastomer or carbon filled rubber. The VOCs are then desorbed by, for example, heating the sorbent, to recover the VOCs. The recovered VOCs may be incinerated or reused.

2 Claims, 1 Drawing Sheet

FIG. 1

METHOD FOR RECOVERY OF VOLATILE ORGANIC COMPOUNDS

This application is a Continuation of application Ser. No. 08/023,457 filed Feb. 26, 1993, now abandoned.

FIELD OF THE INVENTION

The present invention relates to the field of removal of volatile organic compounds from contaminated ground water as well as from industrial flue gases, and more particularly to removal of volatile organic compounds through a regenerative sorption process.

BACKGROUND OF THE INVENTION

An organic compound, which has relative volatility of one or greater at room temperature, relative to water, is considered to be a volatile organic compound (VOC). The VOCs and petroleum hydrocarbons are among the most commonly cited organic ground water contaminants. Some of the VOCs are toxic and have been classified as carcinogens. Of particular concern are chlorinated ethylenes, such as trichloroethylene (TCE); tetrachloroethylene, commonly known as perchloroethylene (PCE); and chlorinated ethanes, such as 1,1,1-trichloroethane, which have been used as degreasing solvents for petroleum oils and in a variety of industrial applications. As analytical detection limits have improved, trace amounts of the VOCs (in fractions of a part per billion) have been detected in many water supplies, causing public concern. Although the use of TCE was severely curtailed in 1976, its improper storage and uncontrolled disposal practices resulted in significant TCE contamination of ground water aquifers. Due to its high solubility in water (100 parts per million @25° C.), TCE is highly mobile in soils and water aquifers.

Petroleum spills and leaky underground storage tanks also contribute significantly to ground water contamination. Petroleum products are a complex mixture of hundreds of chemicals, generally having paraffin and naphthalene based hydrocarbons. Petroleum products are generally lighter than water and tend to float above the ground water table.

Similarly due to increasingly stringent clean air regulations, flue gases generated by various chemical industries have to be stripped of the VOCs before they are released into the atmosphere.

Air stripping has proven to be one of the most practical techniques for removing the VOCs from groundwater. By pumping contaminated groundwater through an air stripping tower, many of the VOCs can be removed efficiently at reasonable capital and operating costs. A well-designed system can exceed 99.9% removal of many of the VOCs including benzene, toluene, TCE, PCE, chloroform, methylene chloride, carbon tetrachloride as well as ethylbenzene and xylene (BTEX) contained in gasoline. The process can be designed to simultaneously treat combined contaminations that result from multiple spills and leaks of different chemicals into the groundwater.

In order to meet the required air quality standards, the VOCs transferred to air by the air stripper have to be removed before air is vented to the atmosphere. Some of these processes are disclosed in *Reduction of Volatile Organic Compounds in Aqueous Solutions Through Air Stripping and Gas-Phase Carbon Adsorption* by Fang, C. S. and Khor, Song-Leng in Environmental Progress (Vol. 8, No. 4), November 1989, pages 270–278 and *Vapor-phase adsorption cuts pollution, recovers solvents* by Parmele, Charles S.; OConnell, Wilbert L. and Basdekis, Harold S. in Chemical Engineering, Dec. 31, 1979, pages 58–70. State-of-the-art treatment methods include incineration and activated carbon adsorption. However, both technologies suffer from significant shortcomings. Direct incineration of air streams containing small amounts of organic contaminants is technically feasible, but expensive owing to the large volumes of air that have to be treated. Concentration of the VOCs by carbon adsorption/desorption suffers from a number of serious limitations including low adsorption capacity, sensitivity to the presence of water and water vapor, high temperature regeneration/reactivation, high loss of carbon by attrition and thermal decomposition during regeneration, accumulation of nondesorbables and corrosion caused by HCl formed during the decomposition of chlorinated organics. Saunders, Gary L., Carroll, Jr., John P., Dunbar, David R. and Padgett, Joseph, in *Cost of Controlling Air Stripper Emissions,* Treatment, pages 748–752, conclude that the cost per ton of the VOCs is extremely sensitive to the tons/year of the VOCs adsorbed. Thus, a need exists for providing a regenerative sorption process having a high rate of the VOC sorption.

In addition to carbon adsorbents, a number of carbonaceous adsorbents based on sulfonated styrene/divinylbenzene macroreticular ion exchange resins have been developed. These adsorbents suffer from many of the same disadvantages as carbon adsorbents, including sensitivity to moisture and low adsorption capacity (as low as 5%).

The U.S. Pat. No. 4,764,282 of Snyder, Robert H. is directed to using vulcanized automobile rubber tire scrap for absorbing halogenated hydrocarbon waste, prior to its incineration at suitable sites. However, no means for regenerating sorbed tire scrap is disclosed.

The U.S. Pat. No. 4,519,816 of Clarke, Donald H. is directed to using polyurethane foam for separating the VOCs from air.

STATEMENT OF THE INVENTION

Accordingly, it is an object of the present invention to provide an efficient environmental remediation process for removing the VOCs from a gaseous mixture, typically comprising air and the VOCs.

It is still an object of the present invention to provide a regenerative sorbent medium that can be repeatedly used to separate the VOCs from a gaseous mixture, such as that formed by air and the VOCs.

It is yet another object of the present invention to provide an inexpensive, high adsorption capacity sorbent medium that has low sensitivity to the presence of moisture in a gaseous mixture, typically comprising air and the VOCs.

It is further an object of the present invention to provide an efficient method for removing the VOCs present in contaminated ground water.

The present invention is directed to a method of separating a VOC from a gaseous mixture comprising contacting the gaseous mixture with a sorbent selected from the group consisting of polyester elastomer, carbon filled natural rubber and carbon filled synthetic rubber, sorbing the VOC from the gaseous mixture on the surfaces of the sorbent, and desorbing the sorbed VOC from the sorbent.

The present invention is also directed to a method of separating a VOC from an air/VOC mixture comprising pumping ground water contaminated with the VOC to an air stripper tower, spraying the contaminated ground water into the air stripper tower, passing a first air stream through the air stripper tower to strip away the VOC from the contaminated ground water to form the air/VOC mixture, contacting the air/VOC mixture with a sorbent selected from the group consisting of polyester elastomer, carbon filled natural rubber and carbon filled synthetic rubber, sorbing the VOC from the air/VOC mixture on the surfaces of the sorbent, desorbing the sorbed VOC from the sorbent, and condensing the desorbed VOC.

These and other objects, as well as the scope, nature and utilization of the invention, will be apparent to those skilled in the art from the following description and the appended claims.

BRIEF DESCRIPTION OF THE DRAWING

The foregoing and other objects, aspects and advantages of the invention will be understood from the following detailed description of the invention with reference to the drawing, in which.

DETAILED DESCRIPTION OF THE PREFERRED EMBODIMENTS OF THE INVENTION

Various surveys conducted over the years have identified the following VOCs that constitute about 79.5% of the identified hazardous organic wastes. They are vinyl chloride, 1,2-dichlorethane, carbon tetrachloride, trichloroethylene, tetrachloroethylene, 1,1-dichloroethane, toluene, methyl ethyl ketone, chloroform, acetone, acrolein, 1,1,1-trichloroethane, 1,1,2-trichloroethane, benzene, acrylonitrile, o-xylene, m-xylene, p-xylene, or various combinations thereof. Most of these VOCs are typically found in the contaminated ground water present at hazardous waste sites as well as in the ground water present around older or abandoned gasoline pump stations.

One of the most efficient ways by which these VOCs can be removed from the contaminated water is through an air stripping process. A conventional air stripping process basically involves an interphase mass transfer of the VOCs present in the VOC contaminated water to a stream of air passed through the VOC contaminated water. Thus, the primary objective in air stripping is to transfer as much contamination (VOCs) from the liquid phase (ground water), to the vapor phase, i.e. an air/VOC mixture, where air is used as a stripping agent. As clean air contacts the contaminated water, the net flow of the contaminated molecules will be from the liquid to the vapor phase as the system tries to find equilibrium. The driving force for removal of the VOCs from the contaminated water is greatest when the concentration variation is maximum between the vapor and the liquid. Thus, by continually replenishing the flow of the fresh air, the driving force necessary for the removal of the VOCs from the contaminated water can be maximized.

The rate of mass transfer is proportional to the contaminant concentration in the liquid phase and the equilibrium liquid phase concentration for that contaminant. The higher the contaminant concentration, the greater the driving force required to transfer the contaminant to vapor phase. The equilibrium concentration of a contaminant depends upon that contaminant's Henry's law constant. Henry's law states that the partial vapor pressure of a chemical compound evaporated from water is directly proportional to the compound's concentration in water and it can be stated as a ratio of:

$$H = \frac{\text{partial vapor pressure}}{\text{concentration in water}} \quad (1)$$

The value (H) represents the volatility of the compound or the tendency of the compound to migrate from a liquid phase to a gas phase. Thus, higher the Henry's law constant for a given compound, higher will be its tendency to migrate from a liquid phase to a gas phase.

Several systems are available for contacting air with the VOC contaminated water. Some of these systems include conventional means, such as spray aerators, mist aerators, cascade trays, diffused aerators, centrifugal air strippers, packed towers and low profile packed towers for increasing contact of air with water. Spray aerators are preferred. Some of the factors affecting the performance of the air stripper are disclosed in *Factors Affecting Hydrocarbon Removal By Air Stripping* by McFarland, Wayne E., Proceedings of Research & Development 92: National Research and Development Conference on the Control of Hazardous Materials, San Francisco, Feb. 4–6, 1992, 42–48 and *Air Stripping Removes Petroleum from Groundwater* by McFarland, Wayne, Water/Engineering and Management, May 1989, pp. 48–52, both of which are incorporated herein by reference.

Typically, the ground water contaminated with the VOCs is present at or below the ground level and it is generally pumped to an air stripper tower. The pumps used for pumping the contaminated water are preferably powered by compressed air instead of electricity to avoid the chance of fire from electrical spark. If the contaminated groundwater contains petroleum products, such as gasoline, kerosene, diesel and the like, the contaminated water is first directed to a holding tank where the petroleum products are skimmed off the top, before the groundwater is pumped into the air stripper tower.

The stripper tower is generally packed with a randomly packed material, such as Lessing rings, Raschig rings, Berl saddle or Pall rings of polypropylene; or one with a structured packing design, such as sheet or film type plates, or vanes, that distribute the incoming contaminated water throughout the tower in films rather than droplets. Since the maximum air-to-water interface area yields the maximum VOC removal efficiency, the goal is to provide a packing material with the maximum surface area possible. Randomly packed materials are preferred. The contaminated water is preferably sprayed from the top of the tower and an air stream is preferably introduced from the bottom of the tower in an opposite direction for achieving maximum air stripping efficiency.

Sometimes the VOCs as well as petroleum are trapped below the ground level in vapor form and they generally migrate at a zone above the pool of the underground contaminated water. A flow of air is flown through the zone containing the trapped VOCs to carry them out of the ground. Such a flow of air is preferably mixed with the contaminated groundwater being pumped into the air stripper tower. As stated earlier, the petroleum products, if present, are first skimmed off in the holding tank.

One of the most efficient methods used in removing the VOCs from gaseous mixtures, such as those formed between air and the VOCs is by means of a regenerative sorption process, which is highly suitable for removing extremely small quantities of the VOCs, typically on the order of less than about 1000 in parts per million, present in air. Thus, large quantities of the VOC contaminated air have to be processed for removing small quantities of the VOCs present therein. In a regenerative sorption process, suitable for the present invention, the gaseous mixture is contacted with a sorbent where the VOCs are sorbed on the surfaces of the sorbent and the remaining gas, typically air, is released to the atmosphere. The sorbent is then desorbed, to separate the sorbed VOCs from the sorbent, and then recycled for sorbing the next batch of the VOCs. It should be noted that in some chemical processes, a gas, such as nitrogen, helium, argon, and the like, may be used instead of air as a stripping agent.

The sorbent, suitable for the process of the present invention, comprises a soft component, also called softblock, and a hard component, also called hardblock. The soft component, it is believed without reliance thereon, plays an active role in the sorption of the VOCs from the gaseous mixture, whereas the hard component is believed to provide the structural integrity to the sorbent structure, such that the surfaces of a sorbent, for example, in a sponge form, are not destroyed or otherwise damaged when the sorbent is repeatedly used to sorb and desorb the VOCs. The sorbent comprises a polyester elastomer, carbon filled rubber or a carbon filled synthetic rubber. The polyester elastomer sorbent is preferred.

The sorbent made of polyester elastomer preferably comprises a copolymer of about 16% to about 64% by weight of the soft component comprising polyoxyalkylene diimide diacids, and a balance of the hard component comprising polyalkylene terephthalate. The soft component is derived from one or more polyoxyalkylene diamines and one or more tricarboxlylic acid compounds containing two vicinal carboxyl groups or an anhydride group and an additional carboxyl group, and is characterized by the following formula:

wherein each R is independently selected from the group consisting of $C_2$ to $C_{20}$ aliphatic and cycloaliphatic trivalent organic radicals and $C_6$ to $C_{20}$ aromatic trivalent organic radicals; each R' is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the hydroxy groups of a long chain ether glycol having an average molecular weight of about 600 to about 12000.

Polyoxyalkylene diimide diacid is such that each R is a $C_6$ trivalent aromatic hydrocarbon radical, each R' is hydrogen and G is the radical remaining after the removal of the hydroxy groups of a long chain ether glycol having an average molecular weight of about 900 to about 4000. The method of producing thermoplastic polyetherimide ester elastomers suitable for use as a sorbent in the present invention are more fully described in the commonly assigned U.S. Pat. No. 4,556,705 and 4,711, 933 and in the commonly assigned European Patent Application having the publication No. 01180149, all of which are hereby incorporated herein by reference.

In all of the following examples of illustrative polymers, the subscript n represents a number of monomer units which form the respective polymeric segments of the described copolymer.

One example of polyester sorbent comprises about 16% to about 64% of a soft component having the formula:

the balance being a hard component having the formula:

Another embodiment of the sorbent comprises a polyester elastomer copolymer having about 6% to about 40% by weight of a first soft component made of polyoxyalkylene diimide diacids, preferably having the formula:

where y varies from about 24% to about 58% by weight of a second soft component of polytetraalkylene glycol, preferably having the formula:

and the balance of a hard component comprising polyalkylene terephthalate, preferably having the formula:

Yet another embodiment of the sorbent comprises a polyester elastomer copolymer having about 6% to about 60% by weight of a first soft component of polyoxyalkylene diimide diacids, preferably having the formula:

where y varies from about 56% to about 58% by weight of a second soft component of polytetraalkylene glycol, preferably having the formula:

and the balance of a hard component comprising polyalkylene terephthalate, preferably having the formula:

Still another embodiment of the sorbent comprises a polyester elastomer copolymer having about 17% to about 40% by weight of a first hard component of polybutylene terephthalate having the formula:

where x varies from about 29% to about 66% by weight of a second hard component made of polyhexylene terephthalate having the formula:

and the balance of a soft component made of polytetramethylene glycol having the formula:

The aforementioned polyester elastomers are produced by General Electric Company, Pittsfield, Mass. under the trade name of Lomod® polyester elastomer resins. Lomod® J polyester elastomers resins (including XJ1013) are copolymers of polybutylene terephthalate (PBT) hardblocks and imide acid softblocks prepared by condensing trimellitic anhydride (TMA) with an amine end-capped polypropylene oxide. The percentage of imide acid softblock in the copolymer may vary from 16 to 64%. Table 1, shown below, lists imide acid (soft component) percentages and PBT (hardblock) percentages in each of these Lomod® J resins, along with some of their physical properties.

TABLE 1

Lomod ® J polyester elastomer resin compositions and physical properties

| Resin | % PBT/% Imide Acid | Flex Modulus (psi) | Tm °C. |
|---|---|---|---|
| J613 | 36/64 | 5500 | 182 |
| XJ1013 | 46/54 | 9500 | 194 |
| J1013 | 50/50 | 12,500 | 201 |
| J2513 | 62/38 | 25,000 | 210 |
| J5013 | 75/25 | 55,000 | 218 |
| J7513 | 84/16 | 80,000 | 221 |
| JE630 | 36/64 | | |
| JB610 | 36/64 | 6000 | |
| B1013 | 67/33 | 9500 | 165 |
| B2013 | 80/20 | 9500 | 171 |

In still another embodiment of the sorbent suitable for use in the present invention comprises carbon filled vulcanized natural or synthetic rubbers where it is believed, without reliance thereon, that rubber portion, which forms the soft component acts as a sorbent, and carbon particles along with sulfur crosslinkages form the hard component. As stated earlier, the hard component provides structural integrity to the sorbent. Such a structural integrity is necessary to provide the sorbent with a structure that can withstand the repeated sorption and desorption cycles that occur during the process of the present invention. Natural rubber is generally believed to be cis-1,4-polyisoprene having the formula:

where x is about 5000.

Most commonly used synthetic rubbers are produced by emulsion polymerization of butadiene and styrene in varying ratios, in its most preferred form, the synthetic rubber is formed as a reaction product of polymerization of about 78% of butadiene with about 28% of styrene. Various aspects of producing natural and synthetic rubber suitable as a sorbent in the process of the present invention are disclosed in Rubber and Rubber Products, pp 757-767, which are incorporated herein by reference.

Figure 1:
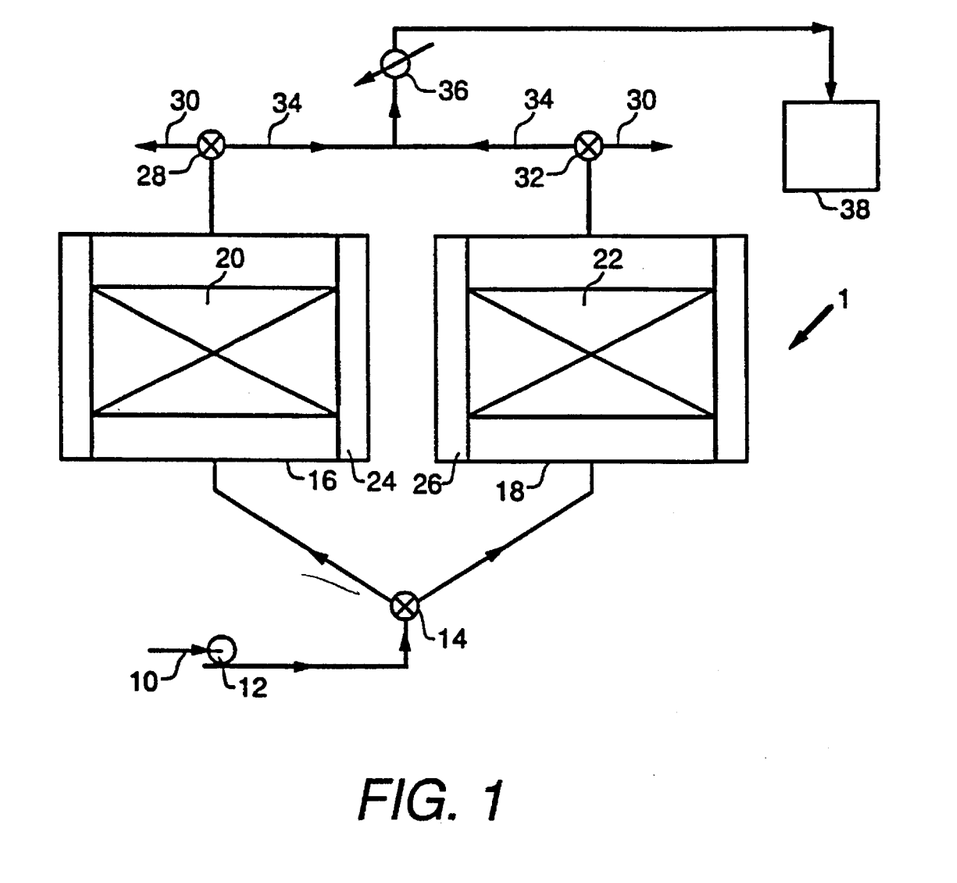
FIG. 1 discloses the process steps of the one embodiment of the invention utilized in recovering the VOCs.

Referring now to FIG. 1 there is shown a sorption apparatus, generally designated by numeral 1, suitable for use in the process of the present invention. The gaseous mixture, generally of air and the VOCs supplied by an intake 10, is introduced by pump means 12 into a first sorption tank 16 via a first directional valve 14. First sorption tank 16 includes a bed or column of a first sorbent 20 as described earlier. First sorbent 20 is generally in the form of a sponge or particulates. A sponge sorbent is preferred. First sorbent 20 in the form of particulates having a size ranging from about 0.1 mm to about 2 mm is preferred. The VOCs from the gaseous mixture are sorbed in first sorbent 20 and the gaseous part of the gaseous mixture, typically air, is vented through a second directional valve 28 to the atmosphere via an exhaust 30. Once first sorbent 20 reaches its optimal sorption capacity, first directional valve 14 directs the flow of the gaseous mixture from intake 10 to a second sorption tank 18 containing a second sorbent 22, same as that described earlier. The structure and function of second sorption tank 18 and second sorbent 22, positioned therein, are same as those of first sorption tank 16 and first sorbent 20. The gaseous part of the gaseous mixture is then vented through a third directional valve 32 to the atmosphere via exhaust 30.

At the same time, the sorbed VOCs in first sorbent 20 in first tank 16 are desorbed and directed by second directional valve 28 via a conduit 34 to a condenser 36 where the desorbed VOCs are condensed and then stored in a recovery tank 38.

The desorption of the sorbed VOCs in first sorbent 20 is preferably accomplished by heating sorbent 20 by heating means 24. First sorbent is heated to about 80° C. to about 120° C., preferably to about 100° C. Vacuum may be provided by connecting conventional vacuum means, not shown, to conduit 34 for further increasing the rate of desorption. It would be apparent to one skilled in the art to provide vent means, not shown, on sorption tanks 16 and 18 to break vacuum as the desorbed VOCs from sorbent 20 or 22 are siphoned out of sorption tanks 16 and 18 by the vacuum means. Once first sorbent 20 is substantially desorbed, the flow of the gaseous mixture from intake 10 is then directed by first directional valve 14 to first tank 16, while second sorbent 22 having the VOCs sorbed therein is desorbed by heating second sorbent 22 through heating means 26. The desorbed VOCs from second sorbent 22 are directed by third directional valve 32 to conduit 34 for eventual recovery in recovery tank 38 after condensation by condensing means 36. The aforementioned steps of sorption/desorption of the VOCs are cyclically repeated. For someone skilled in the art, it would be apparent to add more sorption tanks, than the two shown in FIG. 1.

Furthermore, if needed, the desorbed VOCs in conduit 34 may be conveyed to a conventional incinerator, not shown, for their incineration after or before condensation by condensing means 36. The incineration process of the VOCs is well known in the art.

In another embodiment of the present invention, a sorbent bed or column, similar to sorbent 20 shown in FIG. 1, after having the VOCs sorbed therein by the passage of an air/VOCs mixture, is desorbed by passing a stream of water, which dissolves the sorbed VOCs from the sorbent bed or column into the stream of water. The stream of water is preferably heated to about 70° C. to 90° C. for increasing the solubility of the VOCs in water. Generally a very small quantity of water is required to accomplish such a removal of the VOCs. The water having the dissolved VOCs therein, is then stored for a VOC incineration or a VOC destruction through conventional biodegradation process, which is especially suitable for methylene chloride biodegradation. A surfactant, such as a polyoxyethylene alcohol is preferably added in desired amount at, for example 0.25–1% to the water stream for increasing the solubility of the VOCs in water.

In yet another embodiment of the present invention, the aforementioned water stream is replaced by a stream of high boiling organic solvent, such as kerosene n-dodecane n-hexyl acetate 1-octanol 2,6-dimethyl-4-heptanone to dissolve the sorbed VOCs in the sorbent bed or column, such as sorbent 20 or 22 shown in FIG. 1. The organic solvents are most suitable for desorbing the VOCs having low boiling points, such as chlorinated volatile organic compounds, i.e., trichloroethylene. The stream of solvent is preferably heated to about 30°–60° C. for increasing the solubility of the VOCs in the solvent. The solvent having dissolved VOCs therein can then be easily separated from the VOCs by fractional distillation whereby the clean organic solvent is reused for dissolving the sorbed VOCs.

EXAMPLES

Approximately 1.0 g samples of a given polymer sorbent or carbon adsorbent were weighed and then placed into 1.5 inches (in) diameter×0.25 in tall aluminum pans, stamped for identification. Each pan was capped with a stamped aluminum cap. The pans were loaded, after removing the aluminum caps, onto a metal stand having three perforated metal shelves where each shelf measured 2.5 in×8.25 in and was separated from the next shelf by 1.25 in. A total of thirty pans could be loaded onto the metal stand. The loaded metal stand was then lowered in a 5 in×9 in×9.5 in. VOC producing vapor tank that held 0.5 in of organic solvent being tested as a VOC at its bottom. The tank was provided with a glass cover. Two pieces of filter paper were cut to fit the inner side of the tank walls. The filter papers covered the two largest tank walls of the vapor tank, i.e., 9 in×9.5 in walls. The filter paper acted as a solvent wick for conveying saturated solvent vapor to the polymer sorbents inside the pans placed on the shelves. No effort was made to dry the polymers or carbon adsorbents prior to their introduction to the vapor tank.

At designated intervals, typically 2, 4, 6, 24 and 48 hours (h), the metal stand containing the sorbent-filled pans was removed from the vapor tank. Each pan was removed from the shelf, capped with its designated aluminum cap and then weighed to the nearest 0.001 g. The caps were then removed and the pans were restaged in the vapor tank. The entire weighing process took on average of 5 min.

Control experiments were also performed in which no polymer sorbent was added to a pan. The weight of solvent adsorbed on the surface of the control pan at each designated sampling time was subtracted from the weight measured for all the other pans at same same sampling time. Typically, less than 0.005 g solvent was adsorbed on the control pan. The weight of solvent gained by each polymer was then compared to its initial weight (accurate to 0.001 g), which represented the weight sorbed.

Using the aforestated experimental procedure, a toluene, trichloroethylene (TCE) and unleaded gasoline vapor sorption and desorption study was performed with respect to time for various polymer sorbents. Various grades of Lomod® polyester elastomer resins, produced by General Electric Company, Pittsfield, Mass., Hytrel® polyester elastomer marketed by DuPont de Nemours Company, Inc., Wilmington, Del., carbon-filled NBR (acrylonitrile-butadiene rubber), rubber tire retread (carbon-filled SBR-natural rubber) and a number of other sorbents including activated carbon were used as sorbents. The results, summarized in Tables 2 through 6 below, show that polyester elastomer and carbon filled rubbers show significantly higher rates of sorption and desorption of TCE when compared with activated carbon.

TABLE 2

Sorption and Desorption of Trichloroethylene

| Polymer | Wt. Polymer (g) | Wt. % sorbed 2 h | Wt. % sorbed 4 h | Wt. % sorbed 6 h | Wt. % sorbed 24 h | Wt. % sorbed 48 h | Wt. % desorbed 2 h |
|---|---|---|---|---|---|---|---|
| Lomod ® J613 | 1.017 | 84% | 110% | 122% | 207% | 249% | 100% |
| Lomod ® XJ1013 | 1.053 | 75% | 96% | 103% | 167% | 192% | 100% |
| Lomod ® JE630 | 1.078 | 90% | 119% | 129% | 223% | 270% | 100% |
| Lomod ® JB610 | 1.019 | 92% | 120% | 132% | 219% | 259% | 100% |
| Lomod ® J2513 | 1.055 | 58% | 69% | 72% | 99% | 106% | 100% |
| Lomod ® B1013 | 1.091 | 72% | 72% | 99% | 166% | 194% | 100% |
| Lomod ® B2013 | 1.183 | 52% | 52% | 70% | 106% | 118% | 99% |
| Hytrel ® 4056 | 1.043 | 77% | 77% | 109% | 193% | 231% | 100% |
| carbon-filled NBR | 1.073 | 68% | 68% | 95% | 167% | 194% | 100% |
| rubber tire regrind | 1.212 | 77% | 77% | 119% | 226% | 280% | 100% |
| unfilled NBR* | 1.152 | 85% | 85% | 139% | 267% | 317% | 61% |
| PET | 1.037 | 2% | 2% | 3% | 6% | 8% | 18% |
| Polypropylene* | 1.172 | 17% | 17% | 22% | 28% | 32% | 99% |
| 360 HRG ABS* | 1.048 | 87% | 87% | 140% | 286% | 311% | 99% |
| activated carbon, powder | 1.100 | 54% | 54% | 58% | 62% | 65% | 66% |
| activated carbon, med. | 1.043 | 70% | 70% | 71% | 74% | 77% | 58% |

(*) Aserisks denote loss of physical intrgrioty. such as fusing, swelling, dissolution, and the like upon sortion of Trichloroethylene

TABLE 3

Sorption of Toulene Vapor By Polymeric Materials

| Polymer | Wt. Polymer (g) | Wt. % sorbed at 6 h | Wt. % sorbed at 24 h | Wt. % sorbed at 48 h | Wt. % sorbed at 72 h | Comments (72 h) |
|---|---|---|---|---|---|---|
| Lexan ® 140, powder | 1.087 | 29% | 32% | 32% | 34% | fused surface |
| Polystyrene, 1% DVB | 1.156 | 44% | 81% | 102% | 114% | fused surface |
| Polystyrene, 12% DVB | 1.099 | 29% | 43% | 44% | 47% | fused |
| Polystyrene, 50% DVB | 1.262 | 18% | 32% | 32% | 33% | free/fused |
| Polypropylene, isotactic (Aldrich) | 1.048 | 10% | 13% | 15% | 17% | intact |
| Polypropylene PP10-7944 (Amoco, pellets) | 1.015 | 2% | 8% | 12% | 13% | intact |
| Polyolefin, amorphous (Kodak, pellets) | 1.032 | 43% | 80% | 102% | 117% | swollen |
| Polyethylene, low density (Aldrich) | 1.031 | 9% | 13% | 15% | 16% | intact |
| ABS N27 (pellets) | 1.033 | 22% | 65% | 86% | 96% | fused |
| SAN 360HRG, powder | 1.073 | 58% | 100% | 121% | 134% | fused surface |
| Kraton ® D1107P | 1.210 | 56% | 110% | 140% | 159% | melt |
| Kraton ® G1650 | 1.062 | 55% | 103% | 128% | 142% | melt |
| Neoprene (Baypren ® M1A) | 1.178 | 38% | 89% | 122% | 140% | melt |
| Poly(ethyl methacrylate) | 1.046 | 54% | 114% | 138% | 150% | melt |
| Poly(1,4-butylene adipate) | 1.099 | 17% | 48% | 73% | 89% | melt/fused |
| Nylon 6,6 (Zytel ® 101L) | 1.044 | –0% | –0% | –0% | –0% | intact |
| Hytrel ® 4056 | 1.030 | 35% | 52% | 59% | 62% | fused/free |
| Hytrel ® 8236 | 1.222 | 7% | 9% | 9% | 9% | fused surface |
| Tenax-GC ® 80/100 | 1.037 | 15% | 21% | 24% | 26% | fused surface |
| P30 (fibrous) | 0.979 | 44% | 58% | 64% | 67% | fused fibers |
| Vestenamer ® 8012 | 1.182 | 40% | 80% | 111% | 134% | fused |
| Noryl ® GTX (pellets) | 1.384 | 0% | 2% | 3% | 4% | fused |
| Noryl ® PX0844 (pellets) | 1.399 | 25% | 71% | 96% | 108% | swollen/fused |
| HIPS (pellets) | 1.461 | 34% | 86% | 118% | 133% | melt |
| EPDM (pellets) | 1.380 | 38% | 76% | 97% | 108% | intact |
| Cycolac ® (FR ABS, pellets) | 1.112 | 20% | 61% | 85% | 96% | fused |
| Buna-N rubber (fine grind) | 1.075 | 40% | 66% | 77% | 81% | intact |
| Rubber tire retread (fine grind) | 1.181 | 48% | 87% | 107% | 117% | intact |
| Lomod ® XJ1013 (fine grind) | 1.095 | 34% | 52% | 61% | 63% | intact |

TABLE 4

Desorption of Toluene Vapor by Polymeric Materials

| Polymer | Wt. Polymer (g) | % Toluene Desorbed after 4 h | % Toluene Desorbed after 72 h |
|---|---|---|---|
| Lexan ® 140, powder | 1.087 | 83% | 90% |
| Polystyrene, 1% DVB | 1.156 | 93% | 96% |
| Polystyrene, 12% DVB | 1.099 | 87% | 94% |
| Polystyrene, 50% DVB | 1.262 | | |
| Polypropylene, isotactic (Aldrich) | 1.048 | 99% | 99% |
| Polypropylene PP10-7944 (Amoco, pellets) | 1.015 | 53% | |
| Polyolefin, amorphous (Kodak, pellets) | 1.032 | 75% | |
| Polyethylene, low density (Aldrich) | 1.031 | 98% | 99% |
| ABS N27 (pellets) | 1.033 | 52% | 83% |
| SAN 360HRG, powder | 1.073 | 99% | 100% |
| Kraton ® D1107P | 1.210 | 82% | 100% |
| Kraton ® G1650 | 1.062 | 72% | 97% |
| Neoprene (Baypren ® M1A) | 1.178 | 84% | 100% |
| Poly(ethyl methacrylate) | 1.046 | 65% | 88% |
| Poly(1,4-butylene adipate) | 1.099 | 80% | 100% |
| Nylon 6,6 (Zytel ® 101L) | 1.044 | 0% | 0% |
| Hytrel ® 4056 | 1.030 | 100% | 100% |
| Hytrel ® 8236 | 1.222 | 77% | 92% |
| Tenax-GC ® 80/100 | 1.037 | 92% | 98% |
| P3O (fibrous) | 0.979 | 62% | 79% |
| Vestenamer ® 8012 | 1.182 | 100% | 100% |
| Noryl ® GTX (pellets) | 1.384 | 57% | 79% |
| Noryl ® PX0844 (pellets) | 1.388 | 76% | 86% |
| HIPS (pellets) | 1.461 | 49% | 82% |
| EPDM (pellets) | 1.380 | 96% | 100% |
| Cycolac ® (FR ABS, pellets) | 1.112 | 65% | 81% |
| carbon-filled NBR (fine grind) | 1.075 | 101% | 100% |
| Rubber tire regrind (fine grind) | 1.181 | 99% | 100% |
| Lomod ® XJ1013 (fine grind) | 1.095 | 101% | 100% |

TABLE 5

Sorption of Unleaded Gasoline Vapor by Polymeric Materials

| Polymer | Wt. Polymer (g) | % sorbed at 2 h | % sorbed at 24 h | % sorbed at 48 h | % sorbed at 72 h | Comments at 72 h |
|---|---|---|---|---|---|---|
| Lexan ® 140, powder | 0.788 | 2% | 5% | 7% | 9% | free powder |
| Polystyrene, 1% DVB | 1.036 | 0% | 4% | 9% | 14% | free powder |
| Polystyrene, 12% DVB | 0.835 | 0% | 3% | 5% | 8% | free powder |
| Polystyrene, 50% DVB | 0.932 | 0% | 2% | 4% | 8% | free/fused powder |
| Polypropylene, isotactic (Aldrich) | 1.075 | 5% | 8% | 9% | 10% | free powder |
| Polypropylene PP10-7944 (Amoco) | 0.908 | 0% | 1% | 2% | 4% | free pellet |
| Polystyrene, 8% DVB | 0.789 | 0% | 2% | 2% | 4% | free powder |
| Polyolefin, amorphous (Kodak) | 0.646 | 14% | 34% | 41% | 49% | free pellet |
| Polypropylene PP10-7944 (Amoco) | 1.183 | 0% | 2% | 4% | 6% | free pellet |
| Polypropylene, atactic | 1.148 | 7% | 30% | 41% | 49% | clear soln |
| ABS | 1.018 | 0% | 0% | 2% | 3% | free pellet |
| 360 HRG ABS, powder | 0.780 | 10% | 20% | 25% | 31% | free/fused powder |
| SAN, pellets | 1.289 | 0% | 0% | 0% | 0% | free pellet |
| Gelon ® 25 | 0.928 | 0% | 0% | 0% | 0% | free pellet |
| Hytrel ® 8236 | 0.869 | 0% | 2% | 3% | 4% | free powder |
| Lomod ® XJ1013 | 1.049 | 5% | 9% | 11% | 14% | free pellet |
| Tenax-GC ® 80/100 | 1.303 | 5% | 7% | 8% | 8% | free powder |
| Kraton ® G1650 | 0.888 | 12% | 26% | 32% | 41% | fused/free pellet |
| Polyethylene, low density | 1.428 | 3% | 5% | 6% | 6% | free powder |
| PET (Aldrich) | 1.514 | 0% | 0% | 0% | 0% | free pellet |
| Kraton ® D1107P | 1.117 | 13% | 33% | 41% | 48% | fused pellet |
| Nylon 6,6 (Zytel ® 101L) | 1.067 | 0% | 0% | 0% | 0% | free pellet |
| Poly(vinyl chloride), high MW | 1.034 | 0% | 1% | 1% | 2% | free powder |
| Polyacrylamide | 1.236 | 0% | 0% | 0% | 0% | free powder |
| Vestenamer ® 8012 | 1.115 | 8% | 17% | 22% | 26% | free pellet |
| Neoprene (Baypren ® M1A) | 0.922 | 5% | 18% | 24% | 28% | free foam |
| Poly(vinyl acetate) | 1.269 | 0% | 0% | 0% | 0% | free pellet |
| Poly(ethyl methacrylate) | 0.915 | 0% | 4% | 8% | 14% | free powder |
| Rubber tire regrind | 0.651 | 10% | 21% | 27% | 33% | free powder |

TABLE 6

Desorption of Unleaded Gasoline Vapor by Polymeric Materials

| Polymer | Wt. Polymer (g) | Wt. gasoline, 72 h | % sorbed at 72 h | Comments at 72 H | % Desorbed after 2 h | % Desorbed after 42 h |
| --- | --- | --- | --- | --- | --- | --- |
| Lexan ® 140, powder | 0.788 | 0.072 | 9% | free powder | 31% | 57% |
| Polystyrene, 1% DVB | 1.036 | 0.147 | 14% | free powder | 46% | 61% |
| Polystyrene, 12% DVB | 0.835 | 0.067 | 8% | free powder | 33% | 60% |
| Polystyrene, 50% DVB | 0.932 | 0.075 | 8% | free/fused powder | 51% | 75% |
| Polypropylene, isotactic (Aldrich) | 1.075 | 0.108 | 10% | free powder | 71% | 97% |
| Polypropylene PP10-7944 (Amoco) | 0.908 | 0.032 | 4% | free pellet | 19% | 56% |
| Polystyrene, 8% DVB | 0.789 | 0.030 | 4% | free powder | 27% | 67% |
| Polyolefin, amorphous (Kodak) | 0.646 | 0.315 | 49% | free pellet | 60% | 89% |
| Polypropylene PP10-7944 (Amoco) | 1.183 | 0.071 | 6% | free pellet | 21% | 46% |
| Polypropylene, atactic | 1.148 | 0.566 | 49% | clear soln | 45% | 86% |
| ABS | 1.018 | 0.029 | 3% | free pellet | 28% | 52% |
| ABS 360HRG, powder | 0.780 | 0.243 | 31% | free/fused powder | 72% | 95% |
| SAN, pellets | 1.289 | 0.003 | 0% | free pellet | 33% | 100% |
| Gelon ® 25 | 0.928 | 0.003 | 0% | free pellet | 67% | 100% |
| Hytrel ® 8236 | 0.869 | 0.031 | 4% | free powder | 35% | 65% |
| Lomod ® XJ1013 | 1.049 | 0.142 | 14% | free pellet | 71% | 95% |
| Tenax-GC ® 80/100 | 1.303 | 0.105 | 8% | free powder | 39% | 64% |
| Kraton ® G1650 | 0.888 | 0.363 | 41% | fused/free pellet | 78% | 98% |
| Polyethylene, low density | 1.428 | 0.090 | 6% | free powder | 73% | 104% |
| PET (Aldrich) | 1.514 | 0.003 | 0% | free pellet | 100% | 100% |
| Kraton ® D1107P | 1.117 | 0.532 | 48% | fused pellet | 52% | 91% |
| Nylon 6,6 (Zytel ® 101L) | 1.067 | 0.008 | 0% | free pellet | 25% | 62% |
| Poly(vinyl chloride), high MW | 1.034 | 0.018 | 2% | free powder | 28% | 61% |
| Polyacrylamide | 1.236 | 0.002 | 0% | free powder | 0% | 100% |
| Vestenamer ® 8012 | 1.115 | 0.286 | 26% | free pellet | 75% | 99% |
| Neoprene (Baypren ® M1A) | 0.922 | 0.262 | 28% | free foam | 31% | 77% |
| Poly(vinyl acetate) | 1.269 | 0.007 | 0% | free pellet | 57% | 100% |
| Poly(ethyl methacrylate) | 0.915 | 0.126 | 14% | free powder | 37% | 56% |
| Rubber tire regrind | 0.651 | 0.212 | 33% | free powder | 76% | 101% |

In Table 3 the results of the toluene vapor sorption study in which anhydrous toluene vapor at 22° C. was contacted with 29 different polymers and one blank (a control) are recorded. The sorption of toluene, presented as weight % of toluene sorbed relative to initial polymer weight, was measured at 6, 24, 48 and 72h intervals. As can be seen from Table 3, the sorption of toluene ranged from 0 to 58% after 6h and from 0 to 159% after 72h. Only eight of the twenty-nine screened polymers did not appreciably swell, soften, fuse, or dissolve upon sorbing toluene.

Table 3 also shows that carbon-filled NBR (Buna-N rubber) sorbed 40% toluene after 6h and 81% after 72h. The rubber tire regrind (carbon-filled SBR and natural rubber) sorbed 48% toluene after 6h and 117% after 72h. After only 6h contact with toluene vapor, most of the screened polymers became fused or were dissolved by the sorbed toluene. After 72h sorbed toluene dissolved most of the polymers. However, the polymer sorbents, such as Lomod® XJ1013, Hytrel® 4056 and 8236, carbon-filled NBR and the tire regrind used in the present invention, retained their dimensional stability and did not soften, fuse or dissolve. As was indicated by the TCE sorption study, Lomod®, Hytrel®, and carbon-filled elastomer materials held up well to aggressive chemical environments, such as toluene vapor.

Desorption of toluene from the toluene-saturated polymers generated in the toluene screening study was measured at 4 and 72h intervals directly upon removing the polymers from the toluene vapor tank. The desorption rates given in Table 4 indicate the fast rate at which toluene is desorbed from Lomod®, Hytrel® and carbon filled elastomer rubber materials, i.e. 100% desorption after 4h for Lomod® XJ1013, Hytrel® 4056 and carbon-filled NBR and 99% desorption after 4h for the rubber tire regrind, when compared with other screened polymers, which required 72h for 100% desorption. However, most of these materials were no longer in their initial physical state after desorbing toluene.

Table 5 summarizes the results of a vapor phase sorption study in which twenty-nine different polymers were exposed to a saturated unleaded gasoline vapor (93 octane) at room temperature. The sorption of unleaded gasoline, presented as weight % of unleaded gasoline sorbed relative to initial polymer weight, was measured at 2, 24, 48 and 72h intervals. The sorption capacity of gasoline was significantly less than that measured for VOCs, such as TCE and toluene. The equilibrium sorption capacity ranged from 0 to 49%. Lomod® XJ1013 and Hytrel® 8236 both displayed low sorption capacities, i.e. 5% and 1%, respectively, after 2h, and 14% and 4%, respectively after achieving equilibrium (3 days). The rubber tire regrind (carbon-filled SBR and natural rubber) sorbed 10% unleaded gasoline after 2h, 21% after 24h, 27% after 48h and 33% after 72h. Even at this loading, the tire regrind, unlike a number of other polymer sorbents, retained its physical integrity and did not fuse or dissolve under the same conditions. The Lomod® and Hytrel® copolyesters also did not fuse or melt.

Table 6 records the desorption of these gasoline-saturated polymers after 72h in a gasoline vapor environment. The weight % of gasoline desorbed after 2h demonstrated the fast rate at which unleaded gasoline can be desorbed from Lomod® XJ1013 and rubber tire retread (71% and 76% desorption, respectively, after 2h and 95% and 100% desorption, respectively, after 42h). Most of the polymers screened did not even approach such a high quantitative desorption, even after 42h. Thus, the two examples cited above indicate that Lomod® polyester elastomers and carbon-filled elastomers sorb relatively small quantities of unleaded gasoline when compared to the VOCs, such as TCE and toluene, and that the small amounts of gasoline that they do sorb are easily desorbed at even room temperature.

Unlike activated carbon and other organic polymers, Lomod® and Hytrel® resins and carbon-filled elastomer rubbers, such as NBR, demonstrated low sorption capacity for vapors of unleaded gasoline or aliphatic hydrocarbons. Such selective properties, exhibited by the sorbents suitable for use in the present process, provide means for the separation and recovery of TCE and other CVOCs from aliphatic hydrocarbons (e.g., light petroleum oils, gasoline).

All of the polymer resins screened in the TCE sorption study were in a finely ground, particulate form for providing a high surface area to volume ratio. It is believed, without reliance thereon, that the rate of diffusion of the VOCs into a polymer matrix is dependent upon this ratio. In general, the particle size range for these materials fell between 0.11 mm and 1.00 mm. The particle size distribution for representative Lomod® resins and carbon-filled rubbers is given in Table 7 below. Between 77% to 98% of the Lomod® resins measured less than 1.0 mm; Lomod® JB610 had a significantly smaller average particle size (90% less than 0.50 mm) than the other Lomod® resins. The rubber tire regrind was also more finely ground than the carbon-filled NBR.

TABLE 7

Particle Size Distributions of Lomod ® polyester elastomer Resins and Carbon-Filled Rubbers

| Resin | * Weight Fraction | | | |
|---|---|---|---|---|
| | (A)* | (B)* | (C)* | (D)* |
| Lomod ® J613 | 0.09 | 0.16 | 0.51 | 0.23 |
| Lomod ® XJ1013 | 0.19 | 0.25 | 0.38 | 0.18 |
| Lomod ® JB610 | 0.62 | 0.22 | 0.08 | 0.02 |
| Lomod ® JE630 | 0.18 | 0.24 | 0.45 | 0.14 |
| carbon-filled NBR 0.32 | 0.32 | 0.31 | 0.23 | 0.11 |
| rubber tire regrind | 0.04 | 0.19 | 0.77 | 0.00 |

*(A) — 0.11 mm < x < 0.25 mm; *(B) — 0.25 mm < x < 0.50 mm
*(C) — 0.50 mm < x < 1.0 mm; *(D) — x > 1.0 mm

Powdered activated carbon and activated carbon (Calgon) sorbed only 65 and 77% TCE after 48h. These carbon sorbents did, however, demonstrated reasonably fast initial rates of TCE sorption, i.e. 54 and 70% TCE after 2h. However, TCE was desorbed from carbon at a significantly slower rate than the Lomod® resins and the carbon-filled elastomers (NBR and rubber tire), i.e. 66 and 58% TCE desorption was observed after 2h at room temperature, while all of the Lomod® resins and carbon-filled elastomers desorbed 100% of their sorbed TCE after 2h.

It will be understood that the foregoing description and drawings are only illustrative of the present invention and it is not intended that the invention be limited thereto. Many of the specific embodiments of the present invention will be obvious to one skilled in the art in view of this disclosure. All substitutions, alterations and modifications of the present invention which come within the scope of the following claims or to which the present invention is readily susceptible without departing from the spirit and scope of this disclosure are considered part of the present invention.

What is claimed is:

1. A method for separating volatile organic compounds from a gas stream containing said compounds in gaseous form which comprises the steps of passing the gas stream through a sorbent for said compounds consisting of polyester elastomer comprising soft block units and hard block units, removing the sorbent from contact with the gas stream, desorbing the volatile organic compounds from the sorbent, and reusing the sorbent to sorb volatile organic compounds.

2. The method of claim 1 wherein the volatile organic compounds are selected from the group consisting of vinyl chloride, 1,2-dichlorethane, carbon tetrachloride, trichloroethylene, tetrachloroethylene, 1,1-dichloroethane, toluene, methyl ethyl ketone, chloroform, acetone, acrolein, 1,1,1-trichloroethane, 1,1,2-trichloroethane, benzene, acrylonitrile, o-xylene, m-xylene, p-xylene.

\* \* \* \* \*